United States Patent [19]

Mikeska et al.

[11] Patent Number: 5,076,407
[45] Date of Patent: Dec. 31, 1991

[54] DISCONNECTABLE COUPLING

[75] Inventors: Felix Mikeska, Siegburg; Hans-Jürgen Langen, Frechen, both of Fed. Rep. of Germany

[73] Assignee: Jean Walterscheid GmbH, Lohmar, Fed. Rep. of Germany

[21] Appl. No.: 593,672

[22] Filed: Oct. 5, 1990

[30] Foreign Application Priority Data

Oct. 20, 1989 [DE] Fed. Rep. of Germany ....... 3934963

[51] Int. Cl.$^5$ ............................................. F16D 11/00
[52] U.S. Cl. ......................................... 192/28; 192/46; 192/114 R
[58] Field of Search ..................... 192/28, 26, 46, 71, 192/114 R

[56] References Cited

U.S. PATENT DOCUMENTS 4,466,520  8/1984  Herman ................................ 192/28
4,629,044  12/1986 Post et al. ........................... 192/28
4,771,872  9/1988  Kampf ........................... 192/114 R X

FOREIGN PATENT DOCUMENTS 3528591  7/1986  Fed. Rep. of Germany .
3535264  4/1987  Fed. Rep. of Germany .

Primary Examiner—Allan D. Herrmann
Assistant Examiner—Andrea Pitts
Attorney, Agent, or Firm—Toren, McGeady & Associates

[57] ABSTRACT

A coupling (1) which is disconnectable in the driving direction of rotation has a coupling hub (2) and a coupling sleeve (3) rotatably arranged thereon. The hub (2) and sleeve (3) are connected in the driving direction of rotation by at least one locking ratchet (9, 10) and locking ratchet recess (7, 8 and 13, 14) respectively of the coupling hub (2) and the coupling sleeve (3), a locking pin (19, 20) with its longitudinal side (23, 24) extending in a tangential transverse bore (21, 22) presses the locking ratchets (9, 10) out of the locking ratchet recess (13, 14) in the coupling sleeve (3) when a switching ratchet (36) causes the rotation of the switching ring (4) by means of locking pins (19, 20).

9 Claims, 4 Drawing Sheets ns shown in FIG. 1, the position of the

DISCONNECTABLE COUPLING

BACKGROUND OF THE INVENTION

1. Field of the Invention

The invention relates to a disconnectable coupling comprising a coupling hub and a coupling sleeve rotatably arranged thereon, the hub and the sleeve, in the driving direction of rotation, being connected to each other by at least one radially outwardly resilient locking ratchet and a locking ratchet recess in the sleeve associated therewith, the coupling also comprising a switching ring which is mounted on the outer circumference of the coupling sleeve, which is held in a torque transmitting position and which, when actuated by a retaining member, moves each locking ratchet into a disengaged position.

2. Description of Prior Art

Such a coupling is known from West German Patent Specification Nos. 35 28 591 C2 and 35 35 264 C1 which describe couplings in which the locking ratchets are switched by control pins which in turn are influenced by a control ring and a circumferentially acting spring. The disadvantage of this design is that the control pins may jam or tilt as a result of jamming forces occurring during the disconnecting process between the radial bore and the control pin. Furthermore, such a coupling required a large number of individual parts and in the case of vibrations, the disconnected position is not sufficiently secured.

SUMMARY OF THE INVENTION

It is an object of the present invention to provide a coupling which may be disconnected in the driving direction of rotation, which has a simple design and which may be disconnected under operating loads while avoiding the risk of control parts being jammed.

The invention provides a disconnectable coupling comprising a coupling hub and a coupling sleeve rotatably arranged thereon, the hub and the sleeve, in the driving direction of rotation, being connected to each other by at least one radially outwardly resilient locking ratchet and a locking ratchet recess in the sleeve associated therewith, the coupling also comprising a switching ring which is mounted on the outer circumference of the coupling sleeve, which is held in a torque transmitting position and which, when actuated by a retaining member, moves each locking ratchet into a disengaged position, wherein each locking ratchet recess of the coupling sleeve is associated with a recess which intersects it at a right angle, which is partially open relative to it and which, in the two circumferential directions of the coupling sleeve, each form two stop faces which extend tangentially relative to two radii of the coupling sleeve which enclose an acute angle, and the switching ring is provided with at least one tangential transverse bore corresponding to the recess and with a locking pin received therein.

The open recess with two stop faces on the coupling sleeve provides a means of engagement in the direction of the locking ratchets through the locking ratchet recess, which makes it possible to disconnect the coupling through an initially co-rotating locking pin in the switching ring. It is not possible for the locking pin to tilt or jam. At the same time, the switching ring of the coupling is easily secured to the coupling sleeve by the locking pins, with the coupling being assembled from readily available mass-produced components.

In one embodiment of the invention, the longitudinal side of the locking pin, in the engaged condition of the coupling, contacts the stop face positioned at the front relative to the direction of rotation and, in the disengaged condition of the coupling, contacts the stop face positioned at the rear relative to the direction of rotation and the locking ratchets, in the disengaged condition, are held by the locking pin against the outward resilience within the locking ratchet recesses in the coupling hub.

Because the locking pins may be displaced in the direction opposite to the direction of rotation, the locking ratchets are pushed out of the locking ratchet recesses of the coupling sleeve without any friction and jamming, thereby achieving a high degree of switching safety.

According to a further embodiment of the invention, the angle of rotation of the switching ring, relative to the coupling sleeve, is limited by the two stop faces of the coupling sleeve.

The small angle of rotation of the switching ring relative to the coupling sleeve ensures a fast reaction of the coupling in the form of an "emergency off" function.

In a further embodiment it is proposed that in the engaged and disengaged conditions of the coupling, the coupling sleeve should be held relative to the coupling hub in two circumferentially offset resting recesses by means of a control ball.

The resting recess ensures that both coupling positions as switched are maintained by the control ball in order to avoid any faulty switching when rotary oscillations or vibrations occur.

In a yet further embodiment of the invention, the recesses of the coupling sleeve are adapted to the shape of the locking pins.

By adapting the recess to the shape of the locking pins, the switching ring is fixed on the coupling sleeve in a clearance-free and satisfactory way.

To operate the freewheeling facility of the coupling, the switching ring comprises a retaining recess, and the retaining member comprises a switching ratchet which engages the retaining recess.

To render assembly as easy as possible, it is proposed that the locking pin should be designed as a cylindrical pin.

In a further embodiment of the invention, the two radii are of identical size.

In an alternative embodiment of the invention, a friction ring is arranged between the switching ring and the coupling sleeve.

The friction ring, in the course of friction locking between the switching ring and the coupling sleeve, ensures a slow disconnection of the coupling.

BRIEF DESCRIPTION OF DRAWINGS

Two embodiments of the invention are described in detail below with reference to the accompanying drawings.

In the drawings.

DESCRIPTION OF PREFERRED EMBODIMENTS

Figure 1:
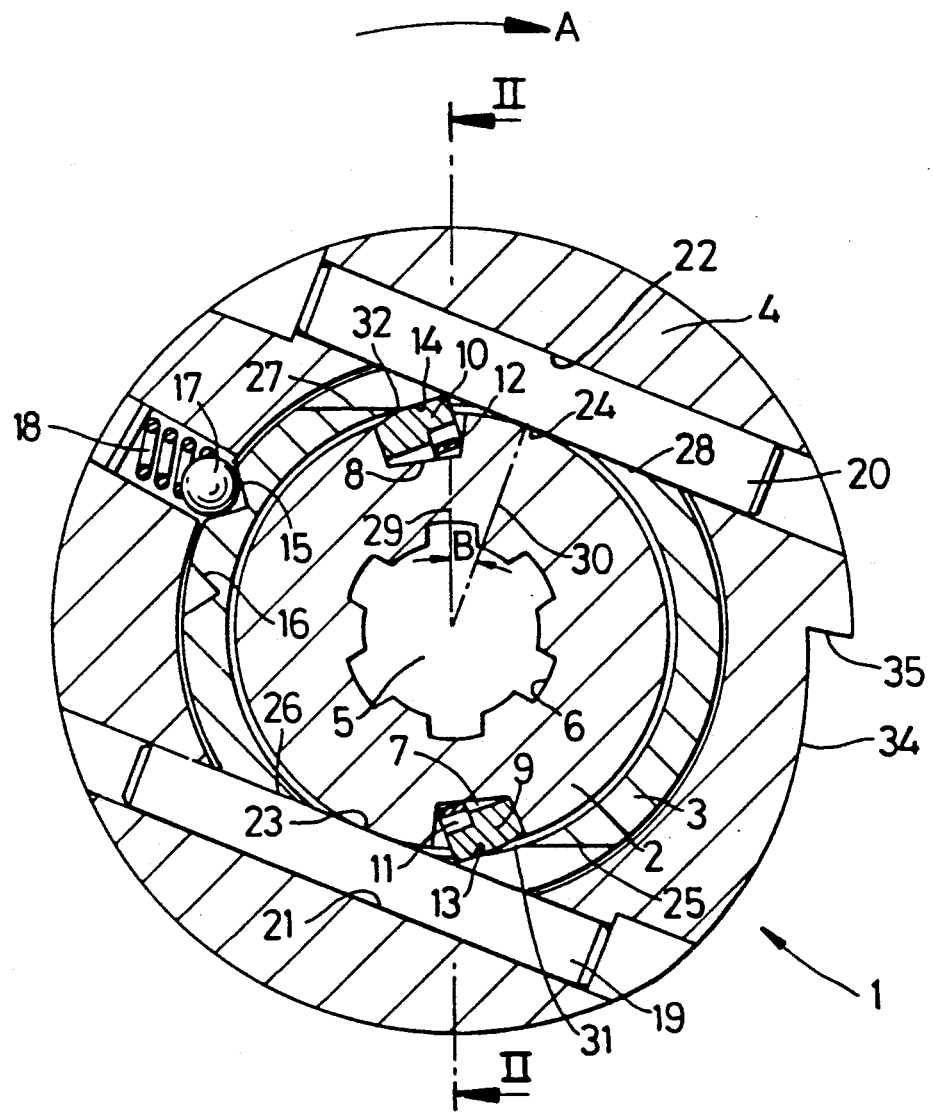
FIG. 1 is a transverse cross-sectional view of a disconnectable coupling in the engaged condition, the position of the section being indicated by the line I—I, in FIG. 2.
Figure 2:
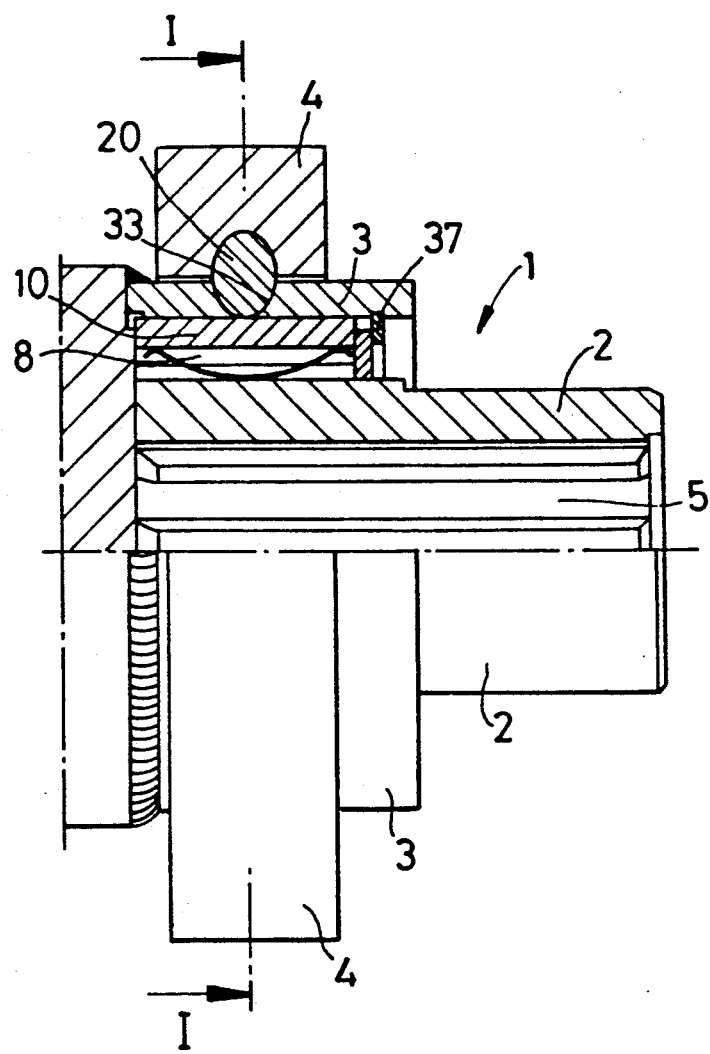
FIG. 2 is a side view partially in section of a disconnectable coupling shown in FIG. 1, the position of the sectional part being indicated by the line II—II in FIG. 1.

FIGS. 1 to 4 show a disconnectable coupling 1 comprising a coupling hub 2, a coupling sleeve 3 and a switching ring 4. The coupling hub 2 (input) comprises a bore 5 with a multi-spline profile 6 for a power take-off shaft which is not illustrated and which, with its multi-spline profile, may engage the multi-spline profile 6. The circumference of the coupling hub 2 has been provided with two locking ratchet recesses 7, 8 which are offset by 180°, with each of them receiving a locking ratchet 9, 10 which are loaded by a spring 11, 12 into the disengaged position and engage the locking ratchet recess 13, 14 of the coupling sleeve 3 (output). This type of engagement of the locking ratchets 9, 10 ensures that if the coupling hub 2 is driven, the coupling sleeve 3 is driven as well. The coupling sleeve 3 is provided with two circumferentially offset resting recesses 15, 16 intended for the torque transmitting and the freewheeling position. The radial switching ring 4 slid over the coupling sleeve 3, by a control ball 17 and a spring 18, is held in the respective position by the control ball 17 pressed into the resting recess 15, 16. The switching ring 4 is secured to the coupling sleeve 3 by two opposed locking pins 19, 20 received in two tangential transverse bores 21, 22. The coupling 1 is attached to the coupling hub 2 via a securing ring 37. The transverse bores 21, 22 of the switching ring 4 are designed in such a way that the locking pins 19, 20, with their longitudinal sides 23, 24, tangentially intersect the partially open recesses 31, 32 of the coupling sleeve 3 and contact a corresponding stop face 25, 27 and 26, 28 respectively.

The stop faces 25, 26 and 27, 28 respectively are obtained by providing two milled regions 33 in the coupling sleeve 3 which are circumferentially offset and extend perpendicularly relative to two radii 29, 30 enclosing an acute angle B with each comprising a partially open recess 31, 32 offset by 180° opposite the inwardly positioned locking ratchet recess 13, 14.

The cross-section of the milled region 33 is adapted to the shape of the locking pins 19, 20 and permits the locking pin 19, 20 to rest against the coupling sleeve 3 and, in the recess 31, 32, contact with the locking ratchets 9, 10 of the coupling hub 2. The locking pins 19, 20 resting against the stop faces 25, 27 or 26, 28, furthermore, serve to secure the switching ring 4 to the coupling sleeve 3. In FIG. 1, the control ball 17 is pressed into the resting recess 15 characterising the switched on position, with the locking pins 19, 20 resting against the stop faces 26, 28 in the driving direction of rotation A and with the locking ratchets 9, 10, via the force of the spring 11, 12, engaging the locking ratchet recess 13, 14 of the coupling sleeve 3.

Figure 3:
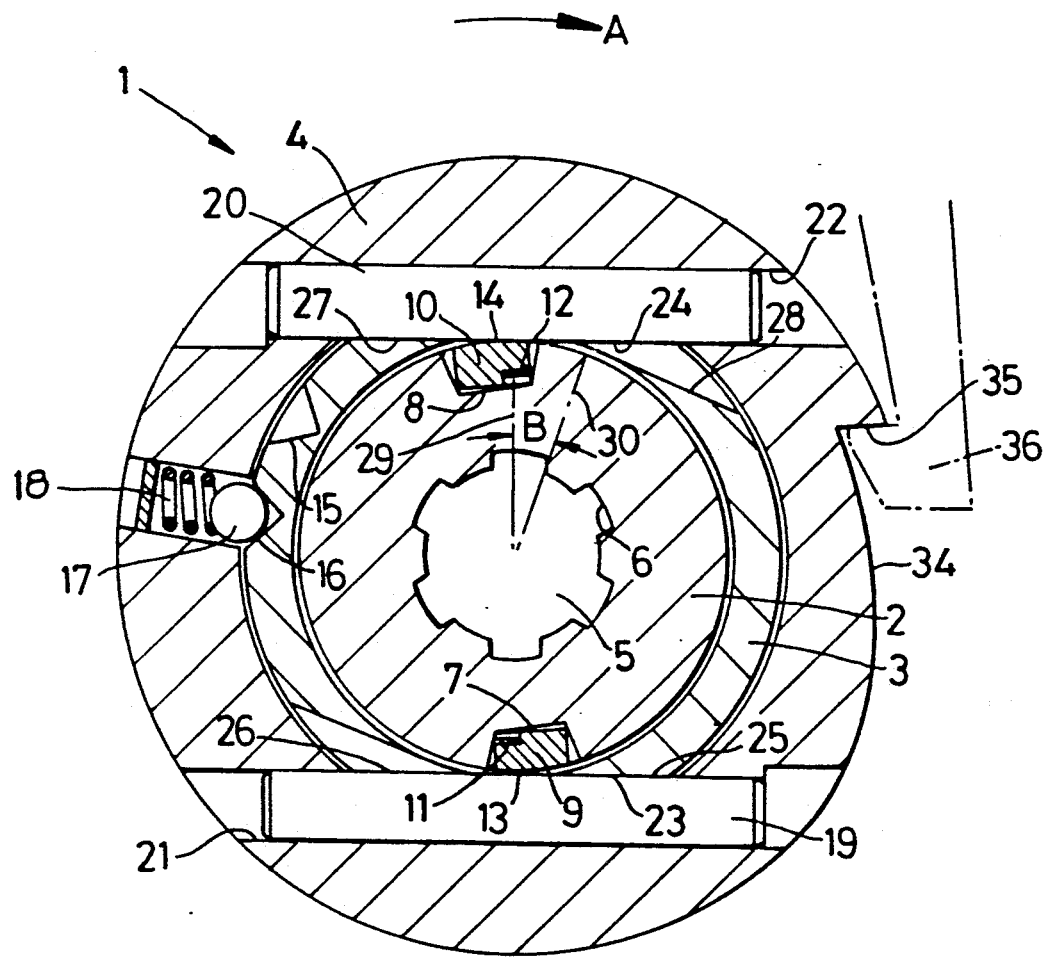
FIG. 3 is a view similar to FIG. 1 but showing the coupling in the disengaged condition.

A retaining recess 35 provided at the outer circumference 34 of the switching ring permits engagement of a switching ratchet 36, as shown in FIG. 3. This switching ratchet 36 permits disconnection of the coupling by external engagement and ensures that the switching ring 4 rotates relative to the coupling sleeve 3 against the driving direction A, so that the locking pins 19, 20 change from the stop face 26, 28 to contacting the stop face 25, 27 while holding the locking ratchets 9, 10 against the force of the spring 11, 12 with their longitudinal sides 23, 24 in the locking ratchet recess 7, 8 of the coupling hub 2. In this condition the coupling hub 2 rotates freely in the coupling sleeve 3 and does not transmit any torque to the coupling hub 2. The control ball 17 engages the resting recess 16 characterising the disconnected position and prevents the switching ring 4 from rotating into the connected position when oscillations or vibrations occur in the driveline.

Figure 4:
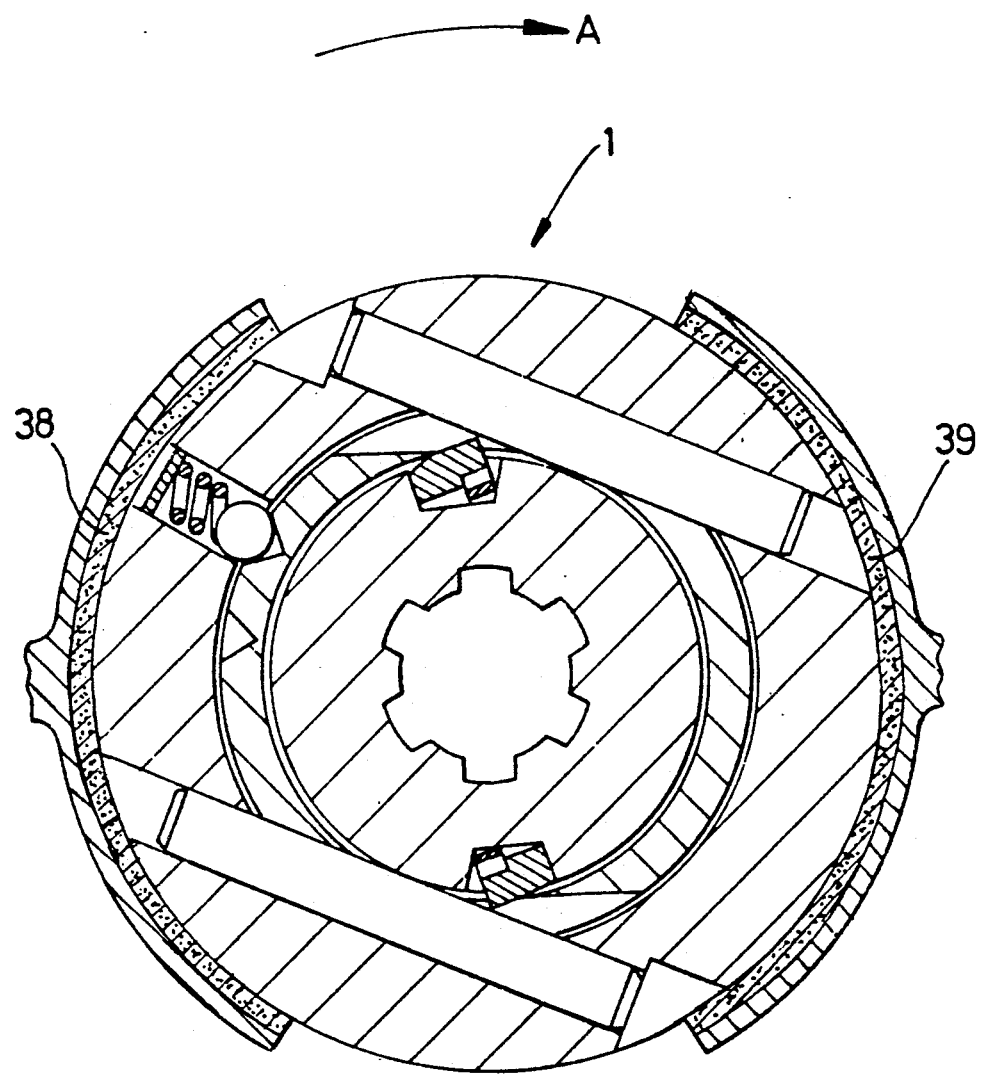
FIG. 4 is a view similar to FIG. 1 but of an alternative coupling.

FIG. 4 illustrates an alternative design of the coupling 1. The switching ring 4 is rotated by two pressed-on friction linings 38, 39, which leads on to the coupling 1 being disconnected as already described.

We claim:

1. A disconnectable coupling comprising a coupling hub and a coupling sleeve rotatably arranged thereon, the hub and the sleeve, in a driving direction of rotation, being connected to each other by at least one radially outwardly resilient locking ratchet and a locking ratchet recess in the sleeve associated therewith, the coupling also comprising a switching ring which is mounted on an outer circumference of the coupling sleeve, which is held in a torque transmitting position and which, when actuated by a retaining member, moves the at least one locking ratchet into a disengaged position, wherein the at least one locking ratchet recess of the coupling sleeve is associated with a recess which intersects the at least one ratchet recess at a right angle, which is partially open relative to the at least one ratchet recess and which, in both circumferential directions of the coupling sleeve, forms two stop faces which extend tangentially relative to two radii of the coupling sleeve which enclose an acute angle, and the switching ring is provided with at least one tangential transverse bore corresponding to the recess and with a locking pin received therein.

2. A coupling according to claim 1, wherein a longitudinal side of the locking pin, in an engaged condition of the coupling, contacts the stop face positioned frontward relative to the direction of rotation, and in a disengaged condition of the coupling, contacts the stop face positioned rearward relative to the direction of rotation and the locking ratchets, in the disengaged condition, are held by the locking pin against an outward resilience within the locking ratchet recesses in the coupling hub.

3. A coupling according to claim 1, wherein relative to the coupling sleeve, an angular rotation of the switching ring is limited by the two stop faces of the coupling sleeve.

4. A coupling according to claim 1, wherein in the engaged and disengaged conditions of the coupling, the coupling sleeve is held relative to the coupling hub in two circumferentially offset resting recesses by means of a control ball.

5. A coupling according to claim 1, wherein the recesses of the coupling sleeve are adapted to a shape of the locking pins.

6. A coupling according to claim 1, wherein the switching ring comprises a retaining recess and the retaining member comprises a switching ratchet which engages the retaining recess.

7. A coupling according to claim 1, wherein the locking pin is a cylindrical pin.

8. A coupling according to claim 1, wherein the two radii are of identical length.

9. A coupling according to claim 1, wherein a friction ring is arranged on an outer circumferential surface of the switching ring.

* * * * *